United States Patent
Smith et al.

(10) Patent No.: US 7,726,743 B2
(45) Date of Patent: Jun. 1, 2010

(54) FITTING FOR A VEHICLE SEAT

(75) Inventors: Don Smith, Lake Ozark, MO (US); Gunter Feickert, Rockenhausen (DE); Joseph Gallatin, Jefferson City, MO (US); Keith B. Cooper, Eldon, MO (US); Ralph Schmitz, Clinton Township, MI (US); Ralf Flesch, Shelby Township, MI (US); Dirk Brassat, Clarkston, MI (US); Martin Stilleke, Recklinghausen (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 7 days.

(21) Appl. No.: 12/284,482

(22) Filed: Sep. 23, 2008

(65) Prior Publication Data

US 2010/0072802 A1   Mar. 25, 2010

(51) Int. Cl.
  *B60N 2/02*   (2006.01)
(52) U.S. Cl. ...................................... 297/362
(58) Field of Classification Search ................ 297/362, 297/361.1, 376; 475/162; 16/319, 348
  See application file for complete search history.

(56) References Cited

U.S. PATENT DOCUMENTS

| 6,454,354 | B1 | 9/2002 | Vossmann et al. |
| 6,578,921 | B2 * | 6/2003 | Koga et al. ................. 297/362 |
| 6,619,743 | B1 | 9/2003 | Scholz et al. |
| 6,799,806 | B2 | 10/2004 | Eppert et al. |
| 7,314,250 | B1 | 1/2008 | Eblenkamp et al. |
| 2006/0055219 | A1 | 3/2006 | Heimann et al. |
| 2007/0170764 | A1 | 7/2007 | Thiel et al. |

* cited by examiner

*Primary Examiner*—Milton Nelson, Jr.
(74) *Attorney, Agent, or Firm*—Womble Carlyle Sandridge & Rice, PLLC

(57) ABSTRACT

A fitting (10) for a vehicle seat comprises a first fitting part (11) and a second fitting part (12), which may rotate relative to each other in a circumferential direction, and which form a disc-shaped unit; a clamping ring (13) that holds the disc-shaped unit together by engaging radially outwardly over the first fitting part (11) and by being fixed to the second fitting part (12); and a group of internal stopper elements (51, 53) which limit the relative rotation between the first fitting part (11) and the second fitting part (12). Each of the first fitting part (11) and the clamping ring (13) has at least one internal stopper element of the group of internal stopper elements (51, 53).

22 Claims, 6 Drawing Sheets

FITTING FOR A VEHICLE SEAT

BACKGROUND OF THE INVENTION

The present invention relates to a fitting for a vehicle seat, comprising a first fitting part and a second fitting part, which may rotate relative to each other in a circumferential direction, and which form a disc-shaped unit; a clamping ring that holds the disc-shaped unit together by engaging radially outwardly over the first fitting part and by being fixed to the second fitting part; and stopper elements which limit the relative rotation between the first fitting part and the second fitting part.

A fitting that is of the type described immediately above, and which is used in a vehicle seat to adjust the angle of inclination of a backrest relative to a seat part by way of a motor drive, is known from US 2007/0170764 A1. The fitting parts of that known fitting have radially projecting brackets by way of which the fitting is attached to the structures of the seat part and backrest, or to adapters connected to the seat part and backrest. The stopper elements are provided externally with respect to the disc-shape unit.

BRIEF SUMMARY OF SOME ASPECTS OF THE INVENTION

An aspect of the present invention is the provision of improvements to a fitting of the type described immediately above, for example to reduce the number of parts for such a fitting.

In accordance with one aspect of the present invention, a fitting for a vehicle seat comprises a first fitting part and a second fitting part, which may rotate relative to each other in a circumferential direction, and which form a disc-shaped unit; a clamping ring that holds the disc-shaped unit together by engaging radially outwardly over the first fitting part and by being fixed to the second fitting part; and a group of internal stopper elements which limit the relative rotation between the first fitting part and the second fitting part; wherein each of the first fitting part and the clamping ring has at least one internal stopper element of the group of internal stopper elements.

The internal stopper elements being respectively provided at the first fitting part and the clamping ring, which already exist, reduces the number of parts of the fitting and its weight. No specific gear parts are required. Usually, the clamping ring will not be hardened. Then, the range of relative rotation can easily be customized by only changing the circumferential length or distance of the internal stopper elements of the clamping ring. The internal stopper elements may be symmetric or left-right-handed or asymmetric with respect to the direction of rotation.

The disc-shaped unit of the first fitting part and the second fitting part, which is held together by the clamping ring, forms a compact shape that saves radial installation space and can be attached at various points. This increases the number of possible applications.

The use of an eccentric planetary gear permits the angle of inclination of the backrest to be steplessly adjusted.

The fitting according to the exemplary embodiments of the invention is preferably designed to be driven by a motor, but it may also be manually driven. The exemplary embodiments of the invention may also be used for detent fittings.

Other aspects and advantages of the present invention will become apparent from the following.

BRIEF DESCRIPTION OF THE DRAWINGS

The invention is described in more detail below with reference to exemplary embodiments illustrated in the drawings, in which.

DETAILED DESCRIPTION OF EXEMPLARY EMBODIMENTS

Figure 1:
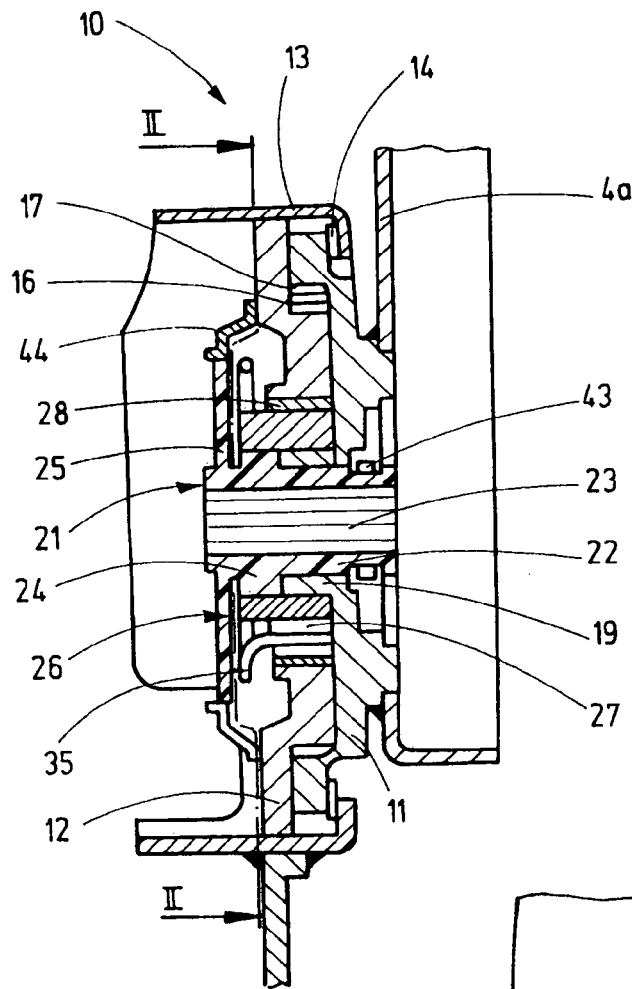
FIG. 1 shows a section through the fitting, with parts of the backrest and seat part being schematically illustrated, in accordance with first and second exemplary embodiments.
Figure 3:
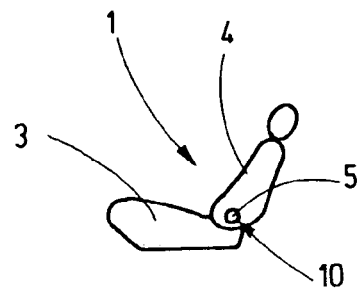
FIG. 3 shows a schematic illustration of a vehicle seat.
Figure 2:
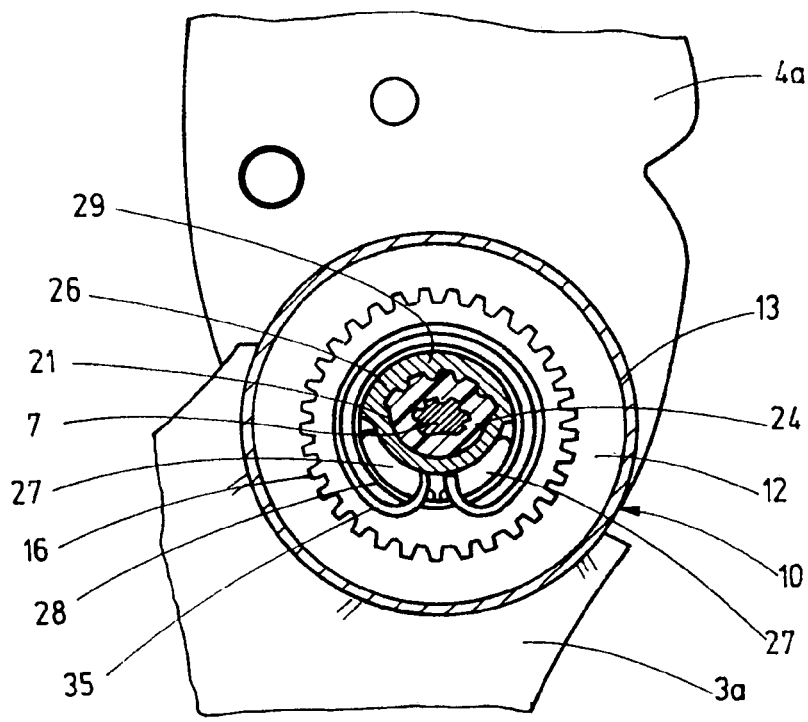
FIG. 2 shows a section through the fitting along the line II-II in FIG. 1.
Figure 4:
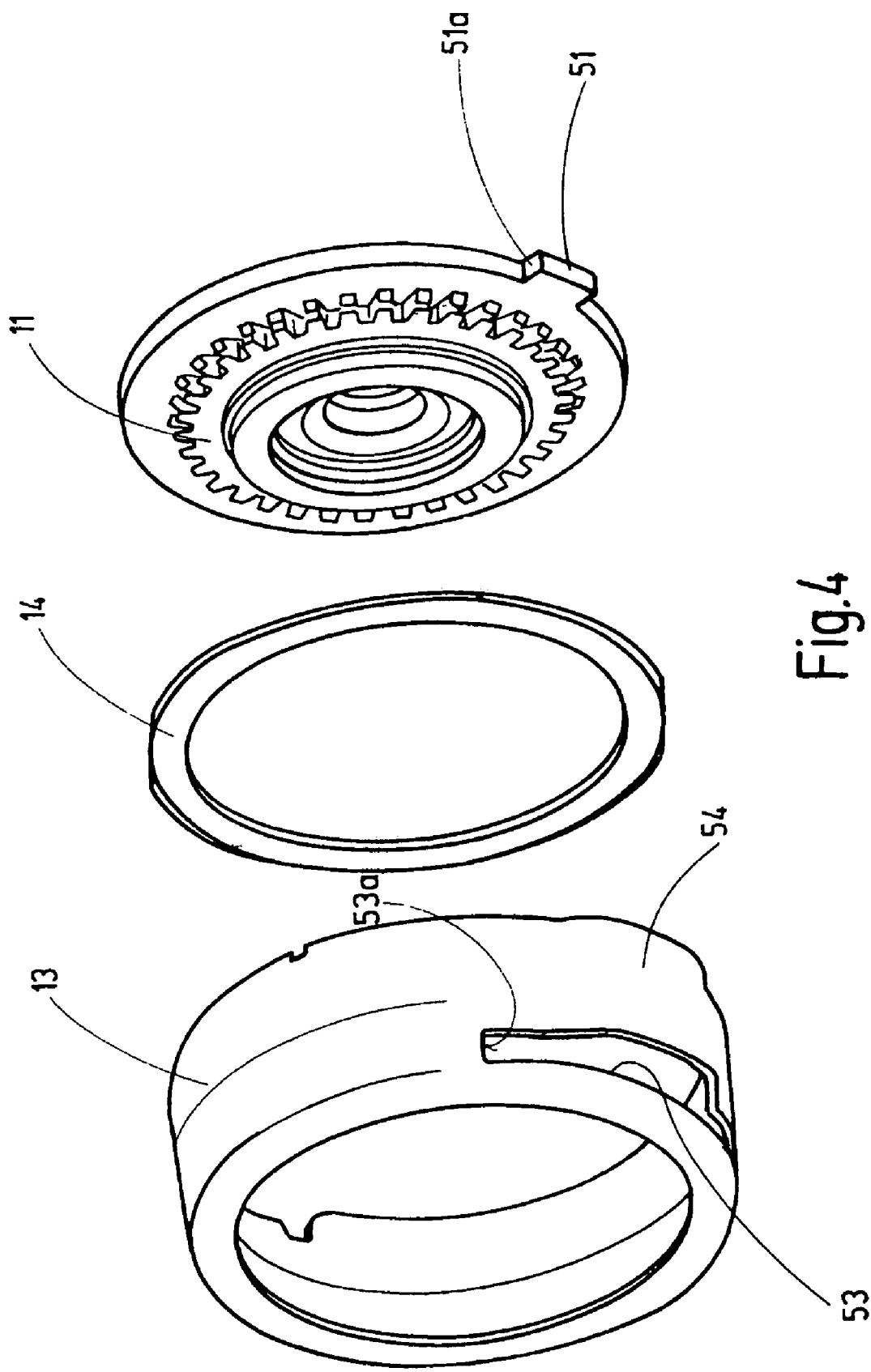
FIG. 4 shows an exploded illustration of the first exemplary embodiment.
Figure 5:
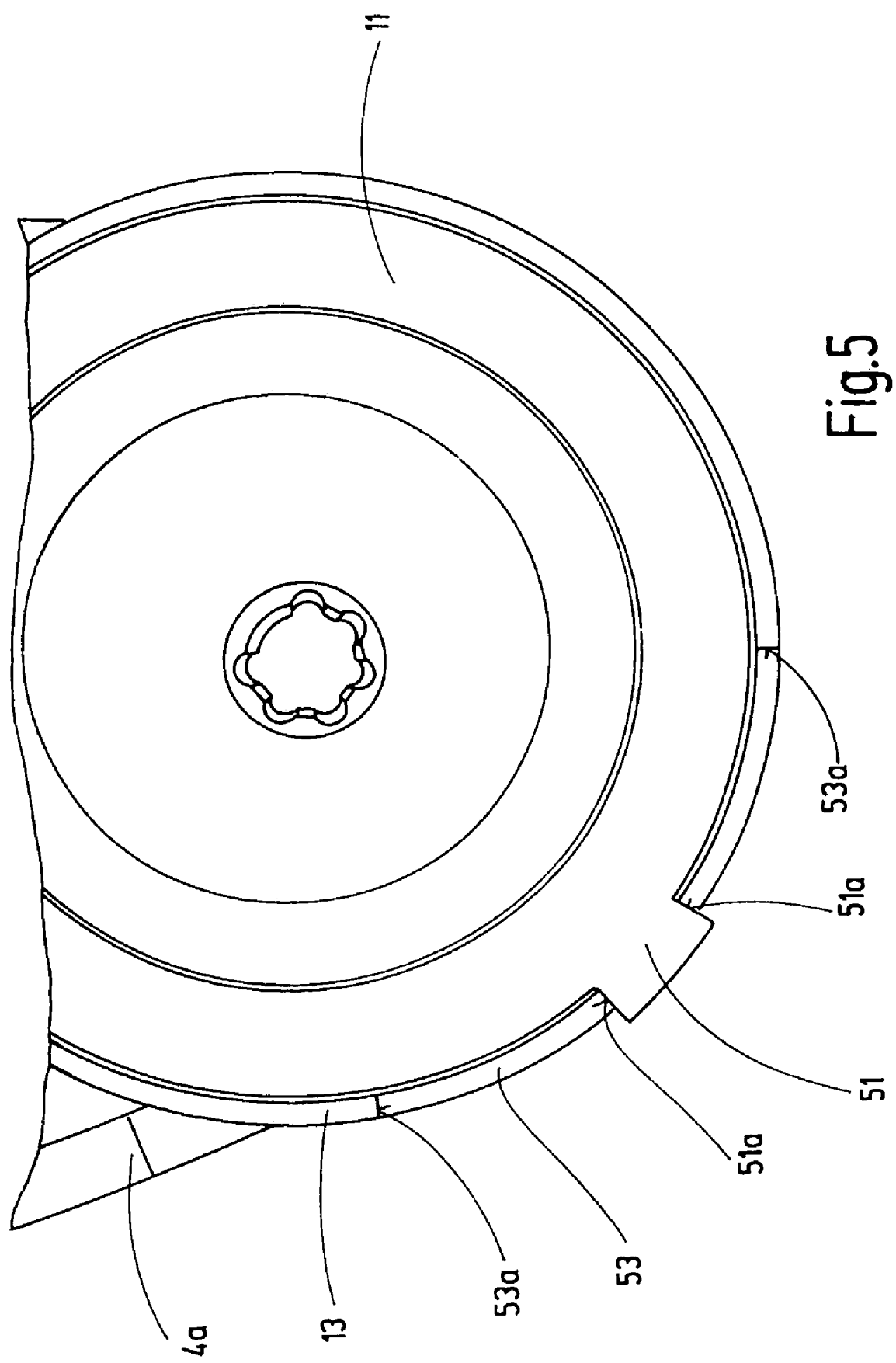
FIG. 5 shows a section through the first exemplary embodiment.
Figure 6:
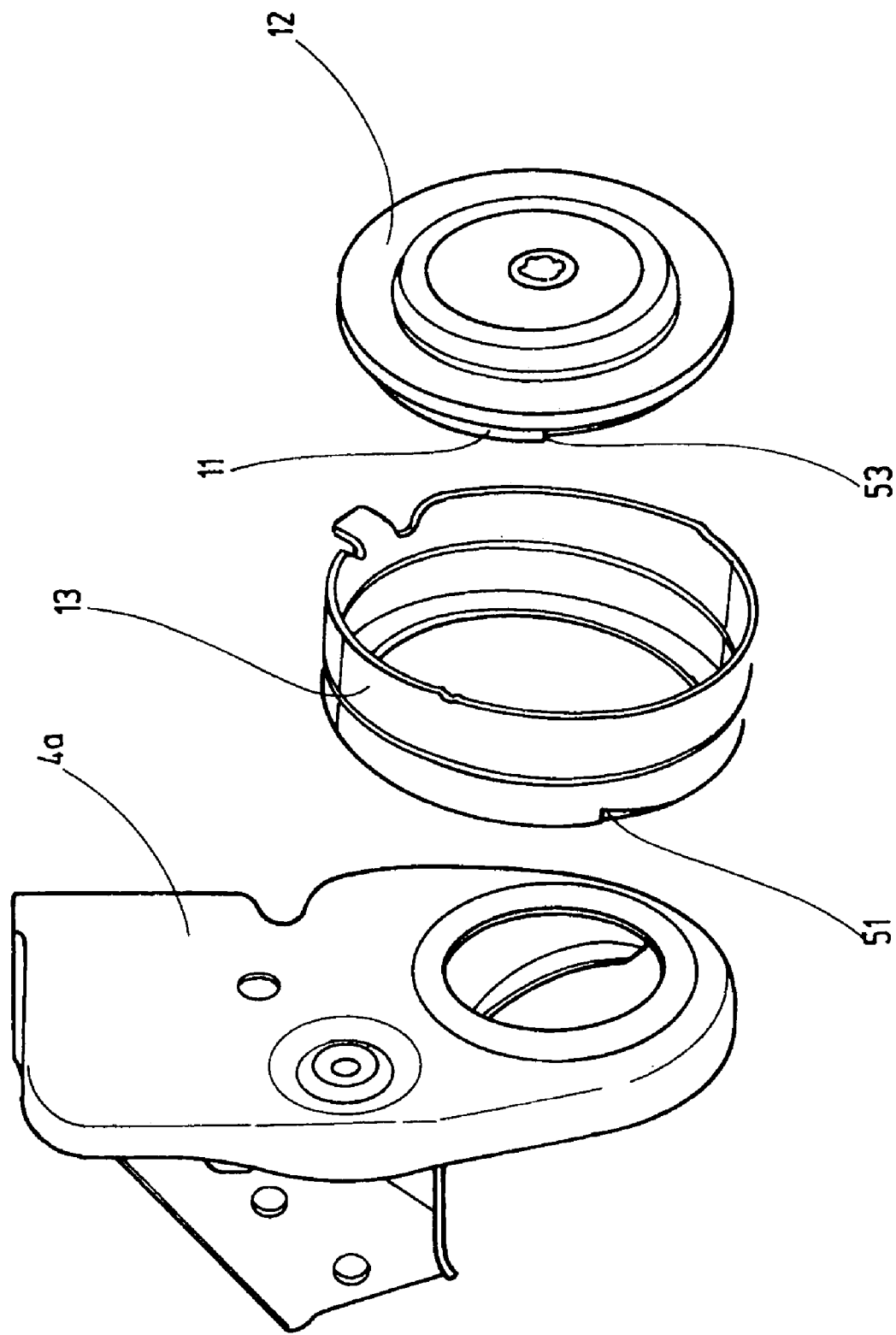
FIG. 6 shows an exploded illustration of the second exemplary embodiment.
Figure 7:
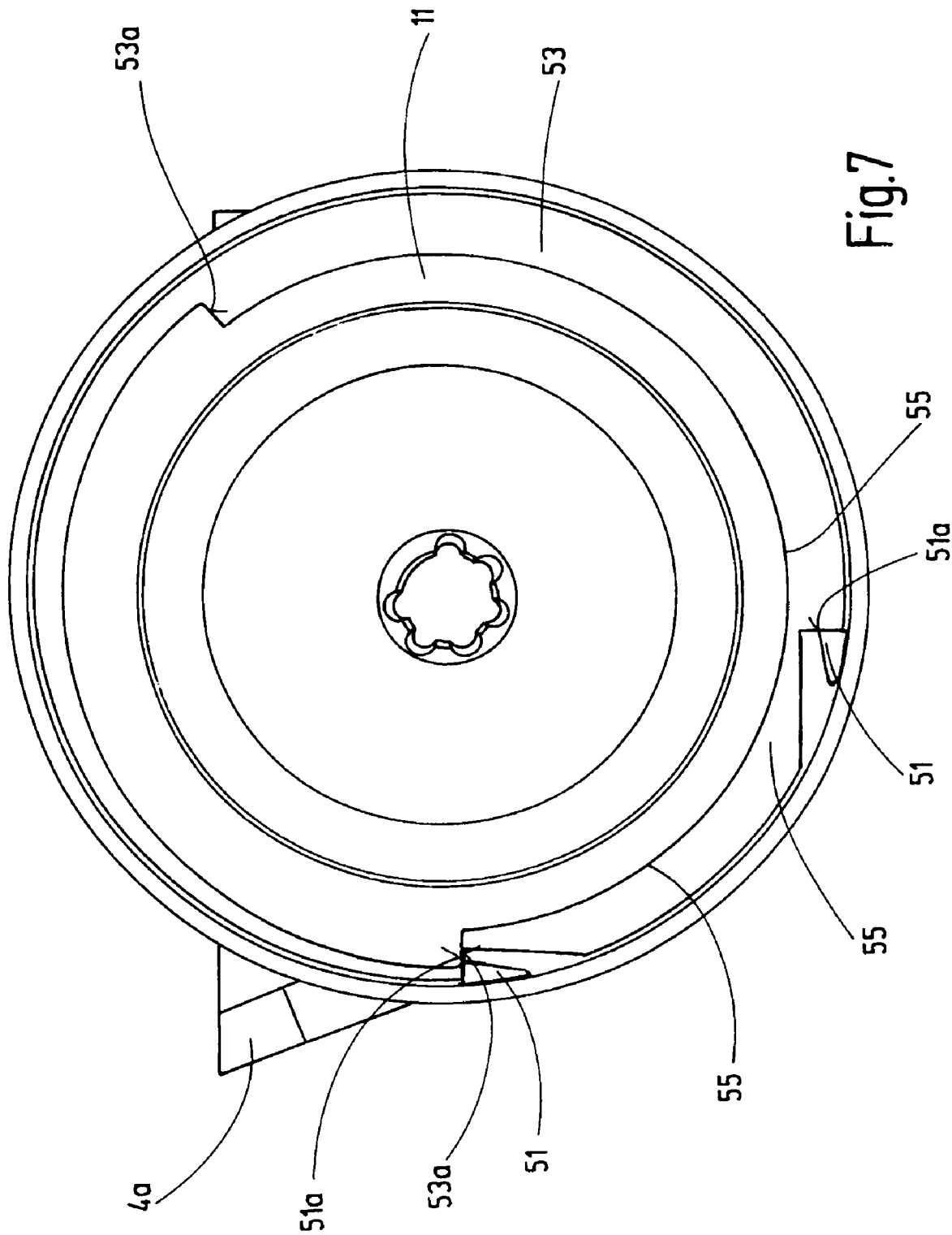
FIG. 7 shows a section through the second exemplary embodiment.
Figure 8:
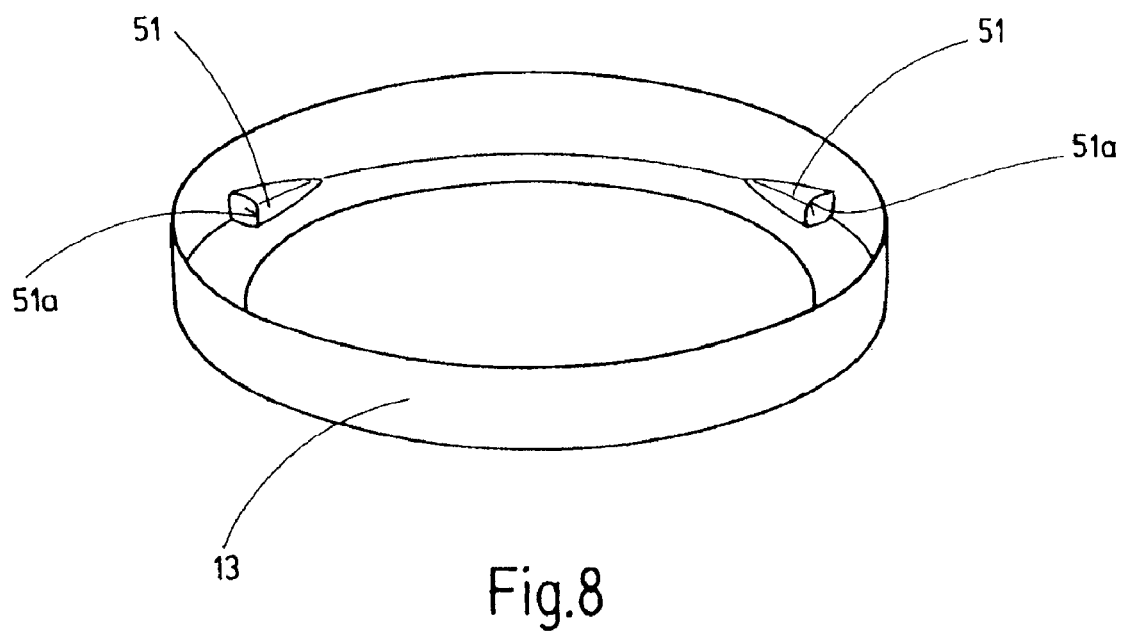
FIG. 8 shows a perspective view of the clamping ring of the second exemplary embodiment.

A vehicle seat 1 for a motor vehicle includes a seat part 3 and a backrest 4. The inclination of the backrest 4 can be adjusted relative to the seat part 3 by way of a motor drive. For adjusting the inclination, a driving device 5, e.g. a hand wheel or an electric motor, rotates a drive shaft 7 which is arranged horizontally in the transition zone between the seat part 3 and the backrest 4. On both sides of the vehicle seat 1, the drive shaft 7 engages in a fitting 10 in a rotationally fixed manner that will be described further below. The drive shaft 7 defines the directional data (axial, radial, circumferential) of a cylindrical coordinate system used below.

The fitting 10 is designed as a geared fitting in which a first fitting part 11 and a second fitting part 12 are connected with each other by way of a gear for the purpose of making and securing adjustments. More specifically, the first fitting part 11 and the second fitting part 12 are connected by way of an eccentric planetary gear—in the exemplary embodiments a self-locking planetary gear—as described, for example, in U.S. Pat. No. 6,619,743. The entire disclosure of U.S. Pat. No. 6,619,743 is incorporated herein by reference. The two fitting parts 11 and 12 are each—more or less—disc-shaped (e.g., substantially disc-shaped) and are mostly made of steel. From a structural standpoint, the two fitting parts 11 and 12 together form a disc-shaped unit. The first fitting part 11 is attached to the structure of the backrest 4, in particular to an upper adapter 4a. The second fitting part 12 is attached to the structure of the seat part 3, in particular to a lower adapter 3a. In another arrangement, the positions of the fittings 11 and 12 can be interchanged.

A clamping ring 13 is provided in order to absorb the axially acting forces, i.e. to hold the fitting parts 11 and 12 together. The use of a clamping ring to hold parts together is described, for example, in U.S. Pat. No. 6,799,806. The entire disclosure of U.S. Pat. No. 6,799,806 is incorporated herein by reference. The clamping ring 13 is fixed to the second fitting part 12, preferably welded to the second fitting part 12 after first being pressed into place. In addition, the clamping ring 13 is fixed to the lower adapter 3a, preferably by welding. On one face side, the clamping ring 13 includes a radially inwardly bent edge by way of which it engages radially outwardly over the first fitting part 11, without impeding the relative movement of the two fitting parts 11 and 12. As a result, the disc-shaped unit is formed. In accordance with the exemplary embodiments, the disc-shaped unit includes the fitting parts 11 and 12, and is held together by the clamping ring 13. In order to reduce the axial play and to obtain a low friction, a sliding ring 14 may be interposed between the radially inwardly bent edge of the clamping ring 13 and the first fitting part 11. Each of the first fitting part 11, the second fitting part 12, and the clamping ring 13 may either be hardened or not hardened. Usually, the first fitting part 11 and the second fitting part 12 will be hardened, while the clamping ring 13 will not be hardened, i.e. the clamping ring 13 will have a normal hardness that is less than the hardness of the fitting parts 11, 12.

In order to form the gear mechanism, a gear wheel 16 with external toothing is embossed on the second fitting part 12, a gear rim 17 with internal toothing is formed on the first fitting part 11, and the gear wheel and the gear rim intermesh with each other. The diameter of the tip circle of the external toothing of the gear wheel 16 is smaller by at least the height of one tooth than the diameter of the root circle of the internal toothing of the gear rim 17. A corresponding difference of at least one tooth between the number of teeth in the gear wheel 16 and in the gear rim 17 permits the gear rim 17 to roll on the gear wheel 16.

Concentrically to the internal toothing of the gear rim 17, the first fitting part 11 has an integrally formed collar element 19 on the side facing the gear wheel 16. A driving bushing 21 is arranged with play by way of a hub 22 inside the collar element 19. The driving bushing 21 is made of plastic. The driving bushing 21 is provided with a receptacle (e.g., provided centrally with a borehole 23) for receiving the drive shaft 7. The profile of the borehole 23 matches the profile of the drive shaft 7, which in the exemplary embodiments is the profile of a splined shaft. Adjacent to its hub 22, the driving bushing 21 includes a step element 24 (e.g., shoulder element) having a larger diameter than the hub 22, followed by a cover disc 25 having a larger diameter than the step element 24.

Over part of its circumference—in the exemplary embodiments over slightly less than half the circumference—the step element 24 includes a radially outwardly oriented external toothing with five teeth in the exemplary embodiments. In the area of the external toothing, the step element 24 carries a driving ring 26 having internal toothing in certain areas. The internal toothing of the driving ring 26 engages positively and completely (e.g., with very little or no play) with the external toothing of the step element 24. Instead of the toothings, other positive-fit transmission profiles using ribs, polygonal shapes or similar are possible. In order to eliminate the play in the positive connection between the internal toothing and the external toothing, the positive fit can be achieved during assembly by displacing the material of step element 24.

The driving ring 26 is made of metal, especially steel, and may be sintered. The driving ring 26 includes a greater axial length than the step element 24. The driving ring 26 is therefore connected only over part of its axial length with the driving bushing 21 by way of the transmission profile. Furthermore, the driving ring 26 is rotatably mounted on the collar element 19, i.e. it is supported on the collar element's outer surface. The driving bushing 21 and the part of the driving ring 26 cooperating with the driving bushing 21 together define a driver.

The driving ring 26 supports two wedge segments 27 which, by way of their curved outer surfaces, support a sliding bearing bushing 28 which is pressed in a rotationally fixed manner into the second fitting part 12. The driving ring 26 includes a driving segment 29 which engages with play between the narrow ends of the wedge segments 27 and which bears the internal toothing on its radially inward-facing side. The driving segment 29, the step element 24 of the driving bushing 21 and a section of the borehole 23, together with the drive shaft 7, thus lie in one plane, whereby multi-axial stress states are avoided. Two projecting pins or, in general, lugs are integrally formed on the inwardly facing side of the cover disc 25 of the driving bushing 21, each with their end surfaces (e.g., tips) bearing on a respective one of the two wedge segments 27, to secure the wedge segments in the axial direction.

The broad ends of the wedge segments 27 face each other. Each of the broad ends of the wedge segments 27 accommodate, by way of a recess defined by projecting sections of material, an angled end finger of an annular spring 35. The spring 35 pushes the wedge segments 27 apart in the circumferential direction, so that in the event of the wedge segments 27 becoming blocked during operation or if the backrest 4 comes up against a load, the radially outer, projecting sections of material (which are located at the broad ends of the wedge segments 27) may come into contact with and act upon one another.

The driving bushing 21 is secured axially on the outside of the first fitting part 11 by way of a clipped-on securing ring 43. A sealing ring 44 is provided on the outside of the second fitting part 12, between the embossing for the gear wheel 16 and the cover disc 25 of the driving bushing 21.

The driving ring 26 (more specifically the part of the driving ring supported on the collar element 19) and the wedge segments 27 define an eccentric which, by extension in the direction of the eccentricity, presses the gear wheel 16 into the gear rim 17 at an engagement point defined by the cooperative interaction between the gear wheel, gear rim and eccentric. When the drive force is provided by the rotating drive shaft 7, torque is transmitted first to the driving bushing 21 and then to the eccentric, so that the eccentric slides along the sliding bearing bushing 28, changing the direction of the eccentricity and thus changing the point of engagement of the gear wheel 16 in the gear rim 17, which manifests itself as a wobbling rolling movement, i.e. as relative rotation (between the first fitting part 11 and the second fitting part 12) with a superimposed wobbling motion. The inclination of the backrest 4 can thus be steplessly adjusted between several use positions. Alternatively, the eccentric planetary gear doesn't comprise a driving ring 26, but the driving segment 29 is provided at the driving bushing 21, as known, for example, from U.S. Pat. No. 7,314,250. The entire disclosure of U.S. Pat. No. 7,314,250 is incorporated herein by reference.

In order to limit the range of adjustment (i.e. the relative rotation) between the first and second fitting parts 11, 12, i.e. the range of the possible inclination of the backrest 4, the first fitting part 11 and the clamping ring 13 form a group of stopper parts. That is, each of the first fitting part 11 and the clamping ring 13 may be referred to as a stopper part. In the exemplary embodiments, one stopper part is provided with at least one stopper 51. The stopper 51 projects radially to the other stopper part and has at least one stopper surface 51a facing into the circumferential direction. The other stopper part is provided with a receptacle 53. The receptacle runs (e.g., extends) in the circumferential direction and has at least one end surface 53a facing in the circumferential direction. The receptacle 53 receives the at least one stopper 51. The at least one stopper 51 and the receptacle 53 form a group of internal stopper elements that are effective in the circumferential direction, i.e. they limit the relative movement of the stopper parts when the one stopper surface 51a of the at least one stopper 51 comes into contact with one end surface 53a of the receptacle 53 and bears against it.

In a first exemplary embodiment, one radially outwardly projecting stopper 51 with two stopper surfaces 51a is provided at (e.g., on) the first fitting part 11, and the receptacle 53 is provided at (e.g., is defined by) the clamping ring 13. The receptacle 53 is designed as a slot (cutout) in the circumferential wall of the clamping ring 13. The receptacle 53 is provided with two end surfaces 53a, each designed for interacting with the stopper 51. For inserting the stopper 51 into the receptacle 53, the clamping ring 13 comprises a bulge 54 in its circumferential wall. The bulge 54 extends radially outwardly, and axially from the receptacle 53 to an edge of the circumferential wall of the clamping ring 13. During assembly of the fitting 10, when the first fitting part 11 is inserted (in the axial direction) into the clamping ring 13, the stopper 51 passes through a passage space provided by the bulge 54 to reach the receptacle 53. The range of adjustment is the circumferential length (i.e. an angle) of the receptacle 53 (about 120°) minus the circumferential distance (i.e. an angle) between the two stopper surfaces 51a (about 10°). The range of adjustment may be adapted to an application by changing the circumferential length of the receptacle 53 (which is typically provided in a non-hardened part).

In a second exemplary embodiment, two stoppers 51 are provided at (e.g., on) the clamping ring 13, and the receptacle 53 is provided at (e.g., is defined by) the first fitting part 11. The two stoppers 51 are cut and embossed from (e.g., are bent portions of) the wall of the clamping ring 13 and project radially inward. The shape of the two stoppers 51 is pyramidal (or conical), wherein the base side of the pyramidal shape is facing in the circumferential direction. The two (embossed) edges of each stopper 51 that are different from (project inwardly from) the non-embossed wall of the clamping ring 13 form the respective stopper surface 51a, which can come into contact with one of two end surfaces 53a of the receptacle 53. The shape of the two stoppers 51 providing the stopper surfaces 51a may be different. Dimples 55 which are provided at (e.g., are defined by) the clamping ring 13 replace the sliding ring 14. The range of adjustment is the circumferential length (i.e. an angle) of the receptacle 53 minus the circumferential distance (i.e. an angle) between the two stopper surfaces 51a. The range of adjustment may be adapted to an application by changing the distance of the two stoppers 51 (which are typically provided in a non-hardened part).

Figure 9:
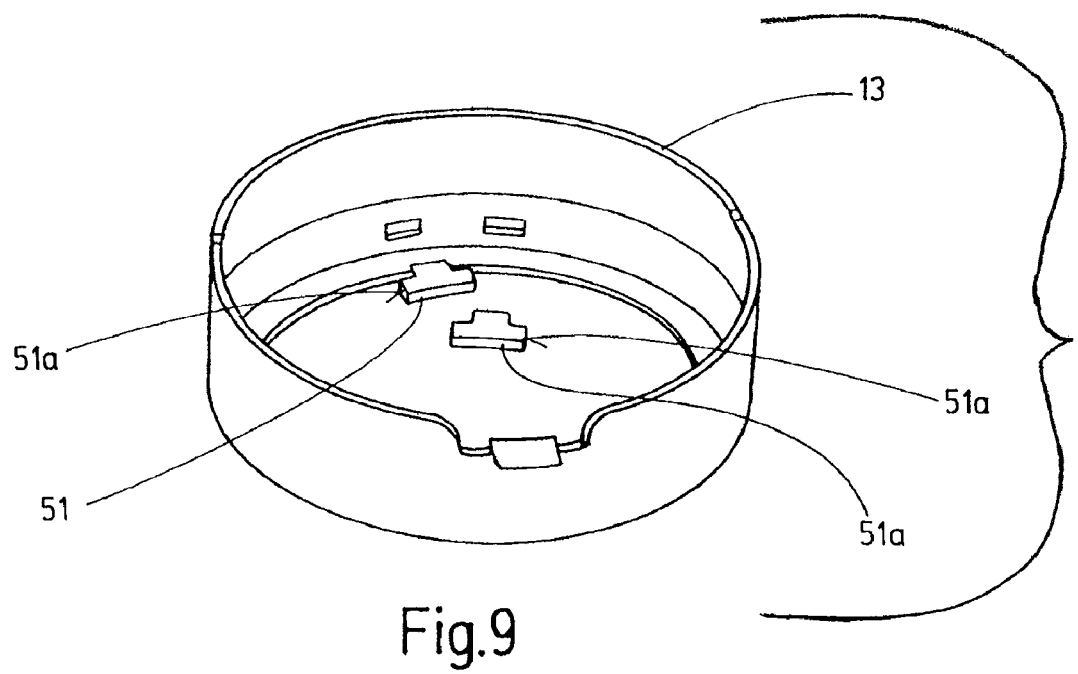
FIG. 9 shows a perspective, exploded view of an alternative clamping ring, in accordance with a variation of the second exemplary embodiment.

According to an alternative exemplary embodiment that is like the second exemplary embodiment except for variations noted and variations that will be apparent to one of ordinary skill in the art, the two stoppers 51 are not in one piece with the clamping ring 13, but are manufactured as separate pieces. The stoppers 51 may be inserted into the punched wall of (e.g., holes in) the clamping ring 13 from the inside (as shown in FIG. 9) or from the outside. The part inside the clamping ring 13 provides the respective stopper surface 51a.

The internal stopper elements have been described for a geared fitting in disc-shape. Such internal stopper elements may also be used for detent fittings in disc-shape. Such a detent fitting comprises also a first fitting part, a second fitting part and a clamping ring, but the first fitting part and the second fitting part are connected with each other by way of a movable locking element, guided by one fitting part and meshing with the other fitting part, as described, for example, in U.S. Pat. No. 6,454,354. The entire disclosure of U.S. Pat. No. 6,454,354 is incorporated herein by reference. The detent fitting is unlocked by rotating the drive shaft, and then the backrest can be pivoted manually.

It will be understood by those skilled in the art that while the present invention has been discussed above with reference to exemplary embodiments, various additions, modifications and changes can be made thereto without departing from the spirit and scope of the invention as set forth in the following claims.

That which is claimed:

1. A fitting for a vehicle seat, the fitting comprising:
 a disk-shaped unit comprising a first fitting part and a second fitting part, which may rotate relative to each other in a circumferential direction;
 a clamping ring that holds the disc-shaped unit together by engaging radially outwardly over the first fitting part and by being fixed to the second fitting part;
 a group of internal stopper elements which are cooperative for limiting the relative rotation between the first fitting part and the second fitting part, wherein each of the first fitting part and the clamping ring has at least one internal stopper element of the group of internal stopper elements;
 an eccentric planetary gear connection between the first fitting part and the second fitting part so that the rotation between the first fitting part and the second fitting part is a relative rolling;
 a rotatably mounted eccentric for being driven, and for causing the relative rolling between the first fitting part and the second fitting part in response to the eccentric being driven; and
 a driver for driving the eccentric so that the eccentric causes the relative rolling between the first fitting part and the second fitting part.

2. The fitting according to claim 1, wherein the group of internal stopper elements comprises at least one stopper and a receptacle in receipt of the at least one stopper.

3. The fitting according to claim 2, wherein the at least one stopper has at least one stopper surface which faces in the circumferential direction.

4. The fitting according to claim 3, wherein the stopper surface is a first stopper surface, and the at least one stopper includes a second stopper surface, and wherein the group of internal stopper elements limit a range of adjustment, and the range of adjustment is a circumferential length of the receptacle minus a circumferential distance between the first and second stopper surfaces.

5. The fitting according to claim 3, wherein the at least one stopper projects radially.

6. The fitting according to claim 3, wherein the at least one stopper and the receptacle are effective in the circumferential direction when the at least one stopper surface comes into contact with at least one end surface of the receptacle.

7. The fitting according to claim 2, wherein the receptacle has at least one end surface which faces in the circumferential direction.

8. The fitting according to claim 7, wherein the at least one stopper and the receptacle are effective in the circumferential direction when the at least one stopper surface comes into contact with the at least one end surface.

9. The fitting according to claim 2, wherein the at least one stopper is provided at the first fitting part, and the receptacle is provided at the clamping ring.

10. The fitting according to claim 9, wherein the clamping ring comprises a bulge, and the bulge is adapted for providing passage of the stopper in an axial direction during assembly of the fitting, in order that the stopper reaches the receptacle.

11. The fitting according to claim 2, wherein the at least one stopper is provided at the clamping ring, and the receptacle is provided at the first fitting part.

12. The fitting according to claim 11, wherein the at least one stopper is embossed from the wall of the clamping ring.

13. The fitting according to claim 11, wherein the at least one stopper comprises two stoppers that are provided at the clamping ring.

14. The fitting according to claim 1, wherein the first fitting part is hardened, and the clamping ring is non-hardened.

15. The fitting according to claim 1, wherein the eccentric comprises two oppositely tensioned wedge segments.

16. The fitting according to claim 1, wherein the fitting is configured so that the relative rotation between the first fitting part and the second fitting part is superimposed by a wobbling motion.

17. The fitting according to claim 1, wherein the fitting is operative for steplessly adjusting inclination of a backrest of the vehicle seat by way of the relative rolling between the first fitting part and the second fitting part, which occurs in response to the eccentric being driven.

18. The fitting of claim 17 in combination with the vehicle seat, wherein the backrest of the vehicle seat is attached to the first fitting part so that the backrest moves with the first fitting part when the first fitting part rolls relative to the second fitting part.

19. A fitting for a vehicle seat, the fitting comprising:
a disk-shaped unit comprising a first fitting part and a second fitting part, which may rotate relative to each other in a circumferential direction, wherein the first fitting part and the second fitting part are connected with each other by way of a movable locking element that is guided by one of the fitting parts and meshing with the other of the fitting parts;
a clamping ring that holds the disc-shaped unit together by engaging radially outwardly over the first fitting part and by being fixed to the second fitting part; and
a group of internal stopper elements which are cooperative for limiting the relative rotation between the first fitting part and the second fitting part,
wherein each of the first fitting part and the clamping ring has at least one internal stopper element of the group of internal stopper elements.

20. The fitting according to claim 19, wherein the group of internal stopper elements comprises at least one stopper and a receptacle in receipt of the at least one stopper.

21. A fitting for a vehicle seat, the fitting comprising:
a disk-shaped unit comprising a first fitting part and a second fitting part, which may rotate relative to each other in a circumferential direction;
a clamping ring that holds the disc-shaped unit together by engaging radially outwardly over the first fitting part and by being fixed to the second fitting part; and
a group of internal stopper elements which are cooperative for limiting the relative rotation between the first fitting part and the second fitting part, wherein
each of the first fitting part and the clamping ring has at least one internal stopper element of the group of internal stopper elements,
the group of internal stopper elements comprises
at least one stopper provided at the first fitting part, and
a receptacle that is provided at the clamping ring and is in receipt of the at least one stopper, and
the clamping ring comprises a bulge, and the bulge is adapted for providing passage of the stopper in an axial direction during assembly of the fitting, in order that the stopper reaches the receptacle.

22. A fitting for a vehicle seat, the fitting comprising:
a disk-shaped unit comprising a first fitting part and a second fitting part, which may rotate relative to each other in a circumferential direction;
a clamping ring that holds the disc-shaped unit together by engaging radially outwardly over the first fitting part and by being fixed to the second fitting part; and
a group of internal stopper elements which are cooperative for limiting the relative rotation between the first fitting part and the second fitting part,
wherein each of the first fitting part and the clamping ring has at least one internal stopper element of the group of internal stopper elements, and
wherein the first fitting part is hardened, and the clamping ring is non-hardened.

* * * * *